Jan. 29, 1935.     C. J. MARTIN     1,989,458
DRESS REBLOCKING APPARATUS
Filed June 7, 1934     3 Sheets-Sheet 1
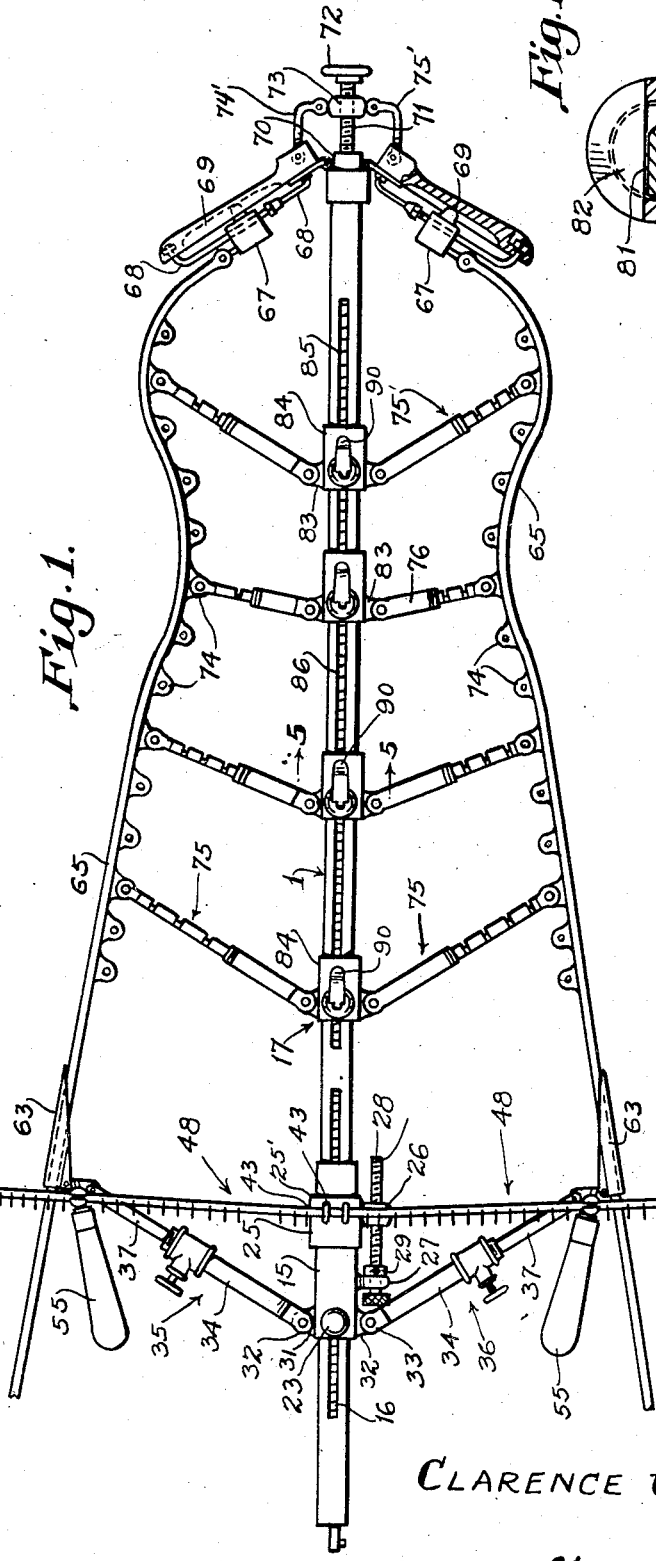
Inventor
CLARENCE J. MARTIN
By Mason Fenwick & Lawrence
Attorneys Jan. 29, 1935.  C. J. MARTIN  1,989,458
DRESS REBLOCKING APPARATUS
Filed June 7, 1934   3 Sheets-Sheet 2
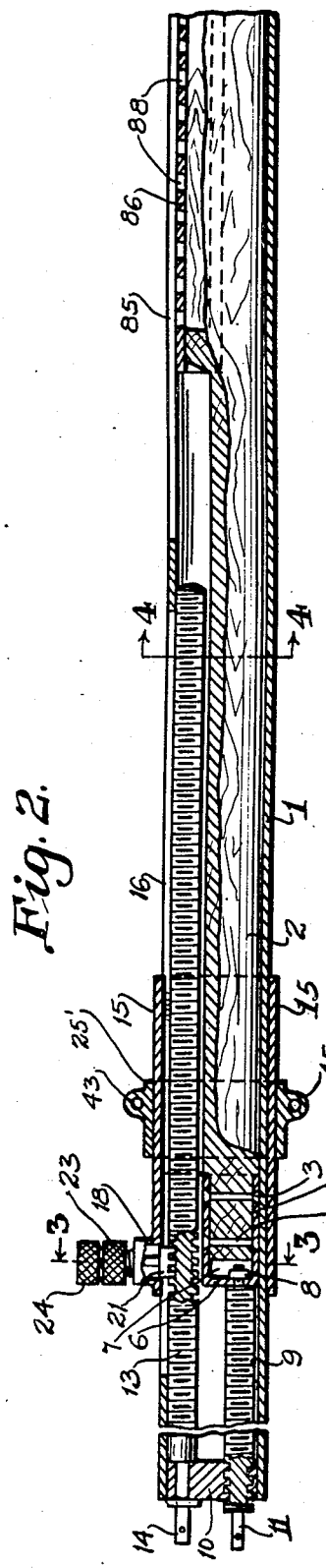
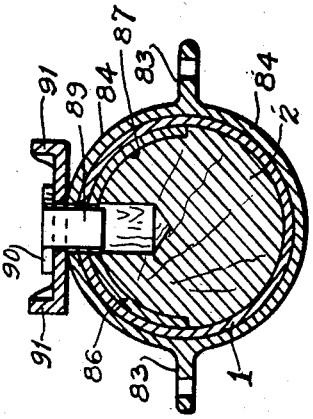
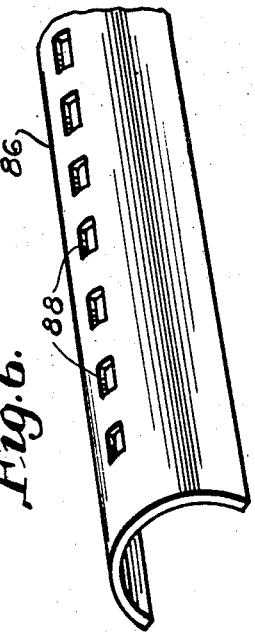
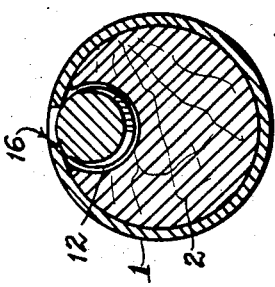
Inventor
CLARENCE J. MARTIN
By Mason Fenwick Lawrence
Attorneys

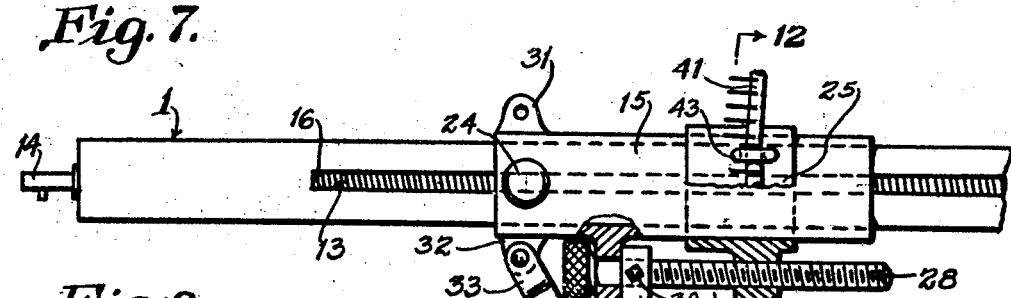
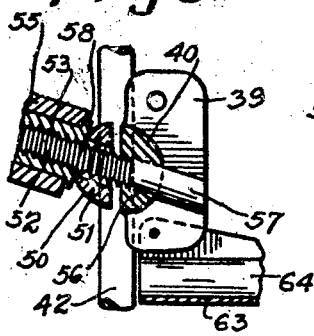
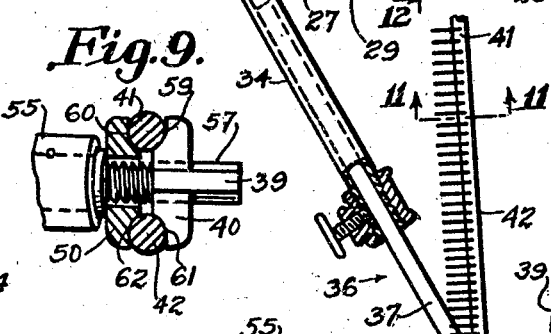
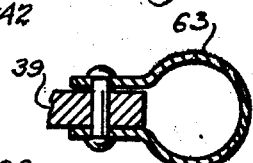
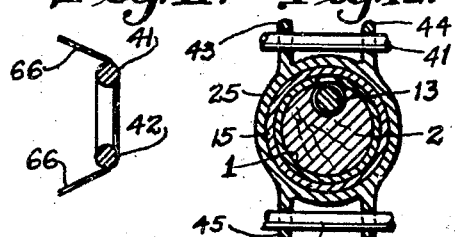
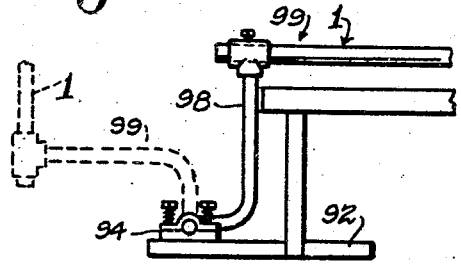
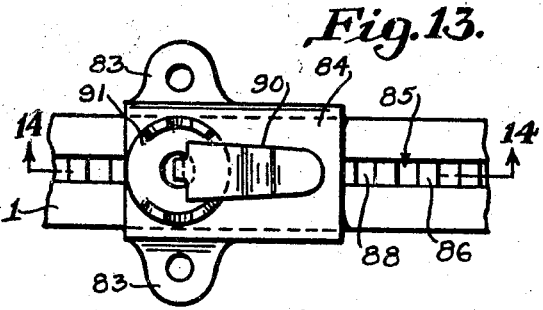
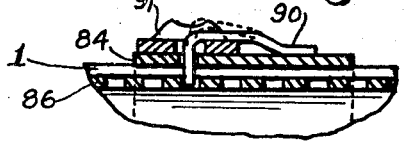
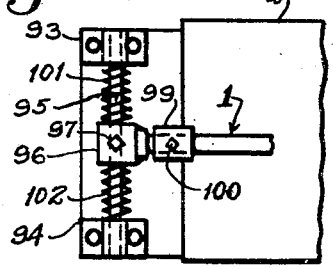
Inventor
CLARENCE J. MARTIN
By Mason Fenwick Lawrence
Attorneys Patented Jan. 29, 1935

1,989,458

UNITED STATES PATENT OFFICE 1,989,458

DRESS REBLOCKING APPARATUS

Clarence J. Martin, San Antonio, Tex.

Application June 7, 1934, Serial No. 729,499

11 Claims. (Cl. 223—19)

The invention forming the subject matter of this application is a dress re-blocking apparatus designed to protect and preserve the forms of fine dresses during the handling thereof incidental to cleaning or repairing operations performed thereon.

One of the main objects of the invention is to provide an apparatus, of the character referred to, for re-blocking or restoring dresses to their original dimensions after having been shrunk.

Other objects of the invention will become apparent as the detailed description thereof proceeds.

In the drawings:

Figure 1 is a plan of one form of the apparatus embodying present invention, part thereof being broken away and shown in section;

Figure 1a is an end elevation of the apparatus shown in Figure 1;

Figure 2 is a longitudinal section, to an enlarged scale, taken on the line 2—2 of Figure 1;

Figure 3 is a horizontal section taken on the line 3—3 of Figure 2;

Figure 4 is a horizontal section taken on the line 4—4 of Figure 2;

Figure 5 is a horizontal section taken on the line 5—5 of Figure 1, the scale being enlarged to correspond to the scale of Figure 2;

Figure 6 is a perspective view of a perforated half-tube forming one element of a quick adjusting spring locking mechanism;

Figure 7 is a fragmentary sectional plan, to an enlarged scale, of skirt adjusting mechanism illustrated in the lower part of Figure 1;

Figure 8 is a fragmentary detail of clamping mechanism forming part of the present invention;

Figure 9 is an end elevation of the mechanism shown in Figure 8;

Figure 10 is a transverse section taken on the line 10—10 of Figure 7;

Figure 11 is a transverse section taken on the line 11—11 of Figure 7;

Figure 12 is a section taken on the line 12—12 of Figure 7;

Figure 13 is a fragmentary elevation, to an enlarged scale, of spring latch mechanism forming part of this invention;

Figure 14 is a section taken on the line 14—14 of Figure 13;

Figure 15 is a fragmentary side elevation of a stand for supporting the apparatus at any desired position of angular adjustment relative to a steam table, or similar device, used to perform certain operations on a garment mounted on this invention;

Figure 16 is a fragmentary plan of the stand shown in Figure 15;

Figure 17 is a sectional elevation to an enlarged scale, of one of the expander arms forming parts of this invention; and Figure 18 is a section taken on the line 18—18 of Figure 17.

As shown in the drawings, the invention comprises a main tube 1 forming a central support for all the other elements of this invention. This tube 1 has slidably mounted therein an inner pole 2 having its lower end secured as by rivets 3 and 4, in a ferrule 5. The lower end of this ferrule is closed by the bottom 6 which is spaced apart from the adjacent end of the pole 2 sufficiently to form a chamber 7, in which the headed pivot extension 8 of a pole adjusting screw 9 may rotate freely.

The lower end of the tube 1 is closed by a plug 10, which is provided with a screwthreaded aperture to receive the screwthreads of the adjusting screw 9. A member 11 extending axially from the lower end of screw 9 is adapted to receive a crank arm or other suitable tool for turning the screw 9 to adjust the pole 2 in either direction in the tube 1.

The lower part of the pole 2 is provided with a cylindrical groove 12 encasing a sleeve adjusting screw 13 which is journaled at its lower end for rotation in the plug 10. A member 14 extending axially from screw 13 is designed to receive a crank arm or other tool for imparting rotation to said screw 13. It will be apparent from Figure 2 of the drawings, that the screw 9 is slidably and rotatably connected to plug 10; while the screw 13 is connected rotatably but not slidably to the plug 10 fixed in the lower end of tube 1.

A long adjustment sleeve 15 is mounted slidably on the tube 1, which is provided with a slot 16 giving access to cylindrical groove 12 and extending lengthwise of tube 1 for the greater part of the length of screw 13, which terminates a short distance from the first expander sleeve 17 (see Figure 1). For quick positive locking adjustment of the sleeve 15 on the tube 1, the sleeve has formed thereon a boss 18 provided with a bore 19 in which is slidably mounted the stem 20 of a fractional nut adapted to be moved into and out of engagement with the threads of screw 13.

The stem 20 has its inner end shaped to form a T-head 21 provided with screw threads adapted to seat properly in the screw threads of the screw 13; and the boss 18 is recessed to receive the T-head 21 when moved out of engagement with screw 13. The outer end of the stem 20 has a flange 22 suitably secured thereto and is adapted to be clamped to an adjusting nut 23 by means of the lock nut 24. The boss 18 is provided with a cylindrical extension 25 coaxial with the stem 20, and is externally screwthreaded to receive the internal screw threads of the nut 23. The construction and operation of this lock nut adjustment will be obvious from inspection of Figures 2 and 3 of the drawings.

A short sleeve 25' is slidably mounted on the long sleeve 15 and has a lug 26 extending laterally therefrom. A lug 27 extends laterally from the sleeve 15. The lug 27 is apertured to receive rotatably a screwthreaded rod 28 which is held against axial movement relative to said lug 27 by means of a collar 29 secured to rod 28 by the usual set screw 30. The lug 26 is provided with a screwthreaded aperture to receive the rod 28. This construction provides a fine adjustment of the sleeve 25, and the parts secured thereto, relative to the central tube 1, after the coarser quick adjustment afforded by the lock nut mechanism carried by sleeve 15.

The long sleeve 15 has pivot lugs 31 and 32 extending in opposite directions from its lower end to receive the clevises 33 at the end of tube 34 forming part of the telescopic skirt adjustment expanders designated generally by the reference numerals 35 and 36. Since these expanders are identical in construction, it will be sufficient to describe one of them in detail.

The tube 34 slidably receives a rod 37 having a clevis 38 at its outer end straddling and pivotally connected to a plate 39 secured to or formed integrally with one member 40 of a skirt adjustment lock securing the outer end of the expander in adjusted position on stretcher wires 41 and 42 forming parts of a frame extending in opposite directions from the short sleeve 25 and substantially at right angles to the main tube 1.

The stretcher wire 41 (see Figure 12) passes through a pair of staples 43 and 44 projecting from one side of sleeve 25; and wire 42 passes through a pair of similar staples or lugs 45 and 46 projecting from the opposite side of sleeve 25. On opposite sides of the main tube 1, the wires are suitably secured to each other in spaced apart relation by the pairs of spacers 46, 47, 48 and 49. It is to be noted that the spacers are of equal length, and somewhat shorter than the diameter of the sleeve 25, causing the wires at the central part of the frame 48 to converge symmetrically in opposite directions from sleeve 25 toward the spacers 47 and 48.

Between the pairs of spacers 46 and 47 and between the pairs of spacers 48 and 49, the wires 41 and 42 are parallel to each other and form guideways for the member 40 and a cooperating locking member 50 (see Figures 8, 9 and 10). The member 50 is provided with a bore 51, through which a screw threaded rod 52 is adapted to pass freely for engagement with an internally screwthreaded thimble 53 which is suitably fixed in one end of a hole 54 extending through a handle 55.

The rod 52 is fixed in a bore 56 extending angularly through the member 40, which may be provided with a reinforcing boss 57 extending along the plate 39 to stiffen the same, and afford a strong connection for the rod 52. The thimble 53 is provided at its upper end with a flange 58 forming a contact surface adapted to engage the clamping member 50 when the handle 55 is operated to draw the members 40 and 50 into clamping engagement with the wires 41 and 42. As shown clearly in Figure 9, the members 40 and 50 have their adjacent edges, on opposite sides of the rod 52 with recesses 59, 60, 61 and 62 adapted to receive the wires 41 and 42 and of such depth as to ensure clamping engagement between said members and wires when the handle 55 is operated for this purpose.

A skirt guard 63 is pivoted at its lower end to the plate 39; and is shaped so as to embrace and form a cylindrical guide 64 in which the lower portion of a flexible frame member 65 may slide as the skirt member is adjusted lengthwise on the main tube 1. Each of the wires 41 and 42 are provided with any desired number of downwardly directed barbs 66, by means of which the skirt portion of a dress may be secured to the skirt stretcher part of the apparatus.

Each of the flexible members 65, symmetrically arranged on opposite sides of the tube 1, is pivoted at its upper end to a block 67 slidably mounted on a U-shaped guide 68 having its opposite ends suitably secured to a shoulder form 69. The inner end of the shoulder form 69 is hinged to member 70 fixed to the upper end of the main tube 1. An adjusting screw 71, rotatable by a hand wheel 72, is suitably swiveled at its inner end of member 7, and carries a nut 73 adapted to be moved toward and from the upper end of main tube 1 by rotation of said screw 71. The nut 73 is pivotally connected by links 74' and 75' to the shoulder forms 69, so as to adjust said forms angularly about their hinge connections with the member 70.

The parts of the frame members 65 between the shoulder forms 69 and the skirt stretcher are provided with pivot lugs 74 spaced apart and adapted to be detachably and pivotally connected to any desired number of telescopic expander or wire-forming arms 75. Each of the arms 75 comprises a tube 76 having a clevis 77 fixed in one end thereof. A segmental rod 78 slides in the tube 76 and has a clevis 79 formed on or suitably secured to the outer end thereof.

The rod 79 is segmental in cross section, the segment being somewhat greater than a semi-circle; and is provided with a series of notches 80 extending substantially at right angles to the flat face 81 of said rod. The tube 76 is slotted transversely near one end to receive a segmental insert 82. The part of said insert projecting within the tube 76 is the complement of the segmental cross section of the rod 78. The construction is such that the rod may be rapidly adjusted in the tube until the insert 82 coincides with one of the notches 80; in which position the rod or tube may be given a quarter turn to lock them together in this position.

The clevis at one end of each expander arm 75 may be detachably pivoted to any of the pivot lugs 74. The clevis at the other end is then pivotally and detachably secured to one of two lugs 83 projecting from opposite sides of an expander sleeve 84, forming one of any desired number of such sleeves which are slidably mounted on the main tube 1.

The main tube 1 is provided with a second slot 85 giving access to a segmental plate 86 of the same curvature as the inner pole 2 and suitably secured to said inner pole in a recess 87 formed therein. The plate 86 is provided with a series of spaced apart apertures 88 adapted to receive a locking stud 89 secured to the free end of a leaf spring 90 having its other end fixed to the sleeve 84. A cam lifter 91 (see Figures 13 and 14) is arranged under the free end of the spring 90 to rotate around the stud 89 for the purpose of lifting and holding the stud out of engagement with any of the notches in the pate 88 during any necessary adjustment of the sleeves 84 along the tube 1.

In order to support the apparatus in convenient position relative to a steam table, or similar device, there is provided a stand including a base 92 having spring friction bearings 93 and 94 fixed thereto. A shaft 95 is journaled in said bearings, and has a sleeve 96 adjustably secured thereto, as by the set screw 97. An L-shaped support 98 is secured to the sleeve 96 and at its upper end is provided with a collar 99 adapted to receive slidably the main tube 1 of the dress reblocking frame. A set screw 100 serves to keep the tube 1 in adjusted position in said collar 99.

The compression springs surrounding the bolts of the bearings 93 and 94 are intended for adjustment to hold the frame at any desired position between horizontal position over the steam table 101 and the vertical position indicated by dotted lines in Figure 5. The weight of the frame may be partly counterbalanced by a torsion spring 102 having each end suitably secured to the base 92 and its central part 103 wound around or otherwise fixed to the L-shaped support 98.

It is believed the operation of the invention will be obvious to persons skilled in the art from inspection of the drawings and the foregoing specification.

What I claim is:

1. Dress reblocking apparatus comprising a supporting rod, flexible frame members arranged on opposite sides of said rod, shoulder forms pivotally connecting said members to said rod, means for adjusting said forms angularly with respect to said rod, arms pivoted at one end to said frame members, and means adjustable along said rod and pivoted to the other ends of said arms to vary the curvatures of said members.

2. Dress reblocking apparatus comprising a supporting rod, flexible frame members arranged on opposite sides of said rod, shoulder forms pivotally connecting said members to said rod, means for adjusting said forms angularly with respect to said rod, arms pivoted at one end to said frame members, means adjustable along said rod and pivoted to the other ends of said arms to vary the curvatures of said members, and means for locking said adjustable means in adjusted position on said rod.

3. Dress reblocking apparatus comprising a central rod, sleeves adjustable along said rod, flexible frame members arranged on opposite sides of said rod, shoulder forms pivotally connecting said members to said rod, means for adjusting said forms angularly with respect to said rod, arms pivoted to said sleeves and members and adjustable to vary the curvature of said members, and means for locking said sleeves in adjusted positions on said rod.

4. Dress reblocking apparatus comprising a tube having a slot extending lengthwise thereof, a pole slidably mounted in said tube and having a series of notches spaced apart thereon in registry with said slot, sleeves slidably mounted on said tube, latches mounted on said tube and adapted to engage said notches, flexible frame members on opposite sides of said tube, means for pivotally connecting said frame members to said sleeves, and means for slidably and pivotally connecting the upper ends of said members to the upper end of said tube.

5. Dress reblocking apparatus comprising a tube having a slot extending lengthwise therethrough, flexible frame members symmetrically arranged on opposite sides of said tube, sleeves slidably mounted on said tube, expander arms having their opposite ends pivoted to said members and sleeves, each arm including means for holding it in various positions of expansion, cooperative means on said sleeves and said tube for holding the sleeves in adjusted position along the slotted portion of said tube, shoulder forms pivotally connecting the upper ends of said members to the upper ends of said tube, and means for adjusting said shoulder forms angularly with respect to said tubes.

6. Dress reblocking apparatus comprising a tube having a slot extending lengthwise therethrough, flexible frame members symmetrically arranged on opposite sides of said tube, a pole slidable in said tube and having notches spaced apart thereon in registry with said slot, sleeves slidable on said tube and having latches in yielding engagement with the notches of said pole, expander arms having their opposite ends pivoted to said members and sleeves, and means at one end of said tube connected to said pole for adjusting the pole lengthwise in said tube.

7. Dress reblocking apparatus comprising a tube having a slot extending lengthwise therethrough, flexible frame members symmetrically arranged on opposite sides of said tube, a pole slidable in said tube and having notches spaced apart thereon in registry with said slot, sleeves slidable on said tube and having latches in yielding engagement with the notches of said pole, expander arms having their opposite ends pivoted to said members and sleeves, means at one end of said tube connected to said pole for adjusting the pole lengthwise in said tube, and a skirt stretcher extending in opposite direction from the lower part of said tubes across the lower end of said frame members.

8. Dress reblocking apparatus comprising a tube having a slot extending lengthwise therethrough, flexible frame members symmetrically arranged on opposite sides of said tube, a pole slidable in said tube and having notches spaced apart thereon in registry with said slot, sleeves slidable on said tube and having latches in yielding engagement with the notches of said pole, expander arms having their opposite ends pivoted to said members and sleeves, means at one end of said tube connected to said pole for adjusting the pole lengthwise in said tube, a sleeve slidable along the lower part of said tube, a skirt stretcher extending in opposite direction from said sleeve and across the lower ends of said frame members, and means for adjusting said sleeve lengthwise of said tube.

9. Dress reblocking apparatus comprising a tube having a slot extending lengthwise therethrough flexible frame members symmetrically arranged on opposite sides of said tubes, a pole slidable in said tube and having notches spaced apart thereon in registry with said slot, sleeves slidable on said tube and having latches in yielding engagement with the notches of said pole, expander arms having their opposite ends pivoted to said members and sleeves, means at one end of said tube connected to said pole for adjusting the pole lengthwise in said tube, a sleeve slidable along the lower part of said tube, a skirt stretcher extending in opposite direction from said sleeve and across the lower ends of said frame members, means for adjusting said sleeves lengthwise of said tube, expander arms pivoted to opposite sides of said sleeve and slidably and pivotally connected to said frame members, the outer ends of said arms pivotally connected to said skirt stretcher, and means for locking said expander arms to said skirt stretcher.

10. Dress reblocking apparatus comprising a tube having a slot extending lengthwise therethrough, flexible frame members symmetrically arranged on opposite sides of said tubes, a pole slidable in said tube and having notches spaced apart thereon in registry with said slot, sleeves slidable on said tube and having latches in yielding engagement with the notches of said pole, expander arms having their opposite ends pivoted to said members and sleeves, means at one end of said tube connected to said pole for adjusting the pole lengthwise in said tube, a sleeve slidable along the lower part of said tube, a skirt stretcher extending in opposite direction from said sleeve and across the lower ends of said frame members, means for adjusting said sleeves lengthwise of said tube, expander arms pivoted to opposite sides of said sleeve and slidably and pivotally connected to said frame members, the outer ends of said arms pivotally connected to said skirt stretcher, means for locking said expander arms to said skirt stretcher, and means for adjusting the central part of said skirt stretcher lengthwise of said sleeve.

11. Dress reblocking apparatus comprising a tube having a slot extending lengthwise therethrough, flexible frame members symmetrically arranged on opposite sides of said tubes, a pole slidable in said tube and having notches spaced apart thereon in registry with said slot, sleeves slidable on said tube and having latches in yielding engagement with the notches of said pole, expander arms having their opposite ends pivoted to said members and sleeves, means at one end of said tube connected to said pole for adjusting the pole lengthwise in said tube, a sleeve slidable along the lower part of said tube, a skirt stretcher extending in opposite direction from said sleeve and across the lower ends of said frame members, means for adjusting said sleeves lengthwise of said tube, expander arms pivoted to opposite sides of said sleeve and slidably and pivotally connected to said frame members, the outer ends of said arms pivotally connected to said skirt stretcher, means for locking said expander arms to said skirt stretcher, means for adjusting said sleeve lengthwise of said tube, a second sleeve adjustable lengthwise of the first named sleeve, said skirt stretcher being connected to and supported at its center by said second sleeve, and means for adjusting the second sleeve on the first named sleeve.

CLARENCE J. MARTIN.